United States Patent
Johansson et al.

(10) Patent No.: US 9,654,270 B2
(45) Date of Patent: May 16, 2017

(54) TEMPORARY BLOCK FLOW RELEASE

(71) Applicant: Telefonaktiebolaget L M Ericsson (publ), Stockholm (SE)

(72) Inventors: Nicklas Johansson, Brokind (SE); John Walter Diachina, Garner, NC (US); Paul Schliwa-Bertling, Ljungsbro (SE); Daniel Widell, Vikbolandet (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 37 days.

(21) Appl. No.: 14/407,562

(22) PCT Filed: Feb. 26, 2013

(86) PCT No.: PCT/SE2013/050171
§ 371 (c)(1),
(2) Date: Dec. 12, 2014

(87) PCT Pub. No.: WO2014/133427
PCT Pub. Date: Sep. 4, 2014

(65) Prior Publication Data
US 2015/0155997 A1 Jun. 4, 2015

(51) Int. Cl.
*H04W 40/00* (2009.01)
*H04B 7/212* (2006.01)
(Continued)

(52) U.S. Cl.
CPC .......... *H04L 5/0055* (2013.01); *H04W 24/08* (2013.01); *H04W 72/042* (2013.01);
(Continued)

(58) Field of Classification Search
CPC . H04W 72/04; H04W 24/08; H04W 72/0433; H04W 88/08; H04W 88/12;
(Continued)

(56) References Cited

U.S. PATENT DOCUMENTS 7,054,268 B1 * 5/2006 Parantainen ............ H04L 69/32
370/231
2002/0045458 A1 * 4/2002 Parantainen .......... H04W 40/00
455/466

(Continued)

FOREIGN PATENT DOCUMENTS

| EP | 1376950 A1 | 1/2004 |
| EP | 2627119 A1 | 8/2013 |
| WO | 0217573 A1 | 2/2002 |

OTHER PUBLICATIONS

"Optimizations for Delayed TBF Release", 3GPP TSG GERAN #46, GP-100879, Telefon AB LM Ericsson, ST-Ericsson, Jeju Island, South Korea, May 17-21, 2010, 1-10 pages.*

(Continued)

*Primary Examiner* — Edan Orgad
*Assistant Examiner* — Vanneilian Lalchinthang
(74) *Attorney, Agent, or Firm* — Murphy, Bilak & Homiller, PLLC

(57) ABSTRACT

A method for a GSM/EDGE node (105, 130), comprising establishing a TBF to another node and entering a transmit state in which data blocks are transmitted via said TBF to said other node. The transmit state is left if (205) there are no data blocks to transmit and positive ACK/NACKs have been received for transmitted data blocks, and, upon leaving said transmit state, a timer is started for the release of said TBF and a predefined TBF mode is entered in which the TBF is regarded (230) as released if the TBF release timer expires before data blocks are received by the network node to transmit to the other node, while, if data blocks are received by the network node to transmit to the receiving node, the predefined TBF mode is exited, the timer is stopped (225) and reset, and the first state is entered.

4 Claims, 9 Drawing Sheets

(51) Int. Cl.
*H04L 5/00* (2006.01)
*H04W 76/06* (2009.01)
*H04W 24/08* (2009.01)
*H04W 72/04* (2009.01)
*H04W 76/04* (2009.01)
*H04W 88/08* (2009.01)
*H04W 88/12* (2009.01)

(52) U.S. Cl.
CPC ... *H04W 72/0413* (2013.01); *H04W 72/0433* (2013.01); *H04W 72/0446* (2013.01); *H04W 76/068* (2013.01); *H04W 76/045* (2013.01); *H04W 88/08* (2013.01); *H04W 88/12* (2013.01)

(58) Field of Classification Search
CPC ........... H04W 72/0446; H04W 76/068; H04W 72/042; H04L 5/00; H04L 5/0055
USPC .......................................................... 370/336
See application file for complete search history.

(56) References Cited

U.S. PATENT DOCUMENTS

2002/0141359 A1* 10/2002 Jei ...................... H04W 72/1289
370/329
2007/0014265 A1* 1/2007 Casaccia ........... H04W 72/1289
370/337
2007/0129088 A1* 6/2007 Gao ...................... H04W 36/24
455/464
2009/0232059 A1* 9/2009 Sundberg ............ H04W 76/025
370/329
2010/0210275 A1* 8/2010 Navratil .............. H04W 72/042
455/450
2011/0038348 A1* 2/2011 Borsella .............. H04W 76/048
370/331

OTHER PUBLICATIONS

3GPP, "3rd Generation Partnership Project; Technical Specification Group GSM/EDGE Radio Access Network; Channel coding (Release 11)", 3GPP TS 45.003 V11.1.0, Nov. 2012, 1-321.

3GPP, "3rd Generation Partnership Project; Technical Specification Group GSM/EDGE Radio Access Network; Multiplexing and multiple access on the radio path (Release 11)", 3GPP TS 45.002 V11.1.0, Nov. 2012, 1-113.

Unknown, Author, "Delayed TBF Release", 3GPP TSG GERAN AdHoc #3, GAHW-000136, Nokia, Orlando, Florida, USA, Dec. 11-15, 2000, 1-3.

Unknown, Author, "Optimizations for Delayed TBF Release", 3GPP TSG GERAN #46, GP-100879, Telefon AB LM Ericsson, ST-Ericsson, Jeju Island, South Korea, May 17-21, 2010, 1-10.

* cited by examiner

TEMPORARY BLOCK FLOW RELEASE

TECHNICAL FIELD

The present invention discloses improved release of Temporary Block Flows for GSM/EDGE networks.

BACKGROUND

In a GSM/EDGE network, in order to transmit RLC, Radio Link Control, data blocks between two nodes such as, e.g. a Base Station Controller, a BSC, and a Mobile Station, an MS, a so called Temporary Block Flow is used. Use may be made of an existing TBF between the two nodes, or, in the absence of an existing TBF, a TBF is established between the two nodes. A TBF is used in one direction only, so that in order to transmit RLC data blocks both in the uplink (MS to BSC) and downlink (BSC to MS) directions, two TBFs are needed, one downlink TBF and one uplink TBF. An RLC data block which is sent in one direction is replied to by means of an ACK/NACK message in the other direction, via a TBF arranged for transmission in that other direction.

In order to establish a TBF, a number of control messages are exchanged between the MS and the BSC. Similarly, when releasing a TBF, control messages are transmitted between the BSC and the MS. Thus, if there is active exchange of data between an MS and the BSC in both directions, i.e. downlink (DL) and uplink (UL), and this exchange of data then ceases, a large number of control messages will have to be sent in both directions, both in the UL and the DL directions, in order to release the DL TBF and the UL TBF. Naturally, it is a desire to minimize traffic on the channels on which control messages are transmitted.

SUMMARY

It is an object of the invention to obviate at least some of the disadvantages mentioned above, and to provide improved release of TBFs in a GSM/EDGE cellular network.

This object is obtained by means of a method for operating a network node in a GSM/EDGE network. The method comprises establishing a TBF, a Temporary Block Flow, to another node in the GSM/EDGE network, and the method further comprises entering a transmit state in which data blocks are transmitted via said TBF to said other node and ACK/NACKs are received from said other node for transmitted data blocks. The method comprises leaving the transmit state if there are no data blocks to transmit to said other node and positive ACK/NACKs have been received from the other node for all transmitted data blocks. The method also comprises, upon leaving said transmit state, starting a timer for the release of said TBF and entering a predefined TBF mode. In the predefined TBF mode, the TBF is regarded as being released if the TBF release timer expires before additional data blocks are received by the network node to transmit to the other node, while, if in said predefined TBF mode, additional data blocks are received by the network node to transmit to said other node via said TBF before the timer has expired, the method comprises exiting the predefined TBF mode, stopping and resetting the timer, and entering the transmit state.

In embodiments of the method, the network node is a Base Station Controller, a BSC, the ACK/NACK messages are Packet Downlink ACK/NACKs, PDANs, and the data blocks are Radio Link Control, RLC, data blocks.

In embodiments of the method, the predefined TBF mode is the delayed downlink TBF release mode.

In embodiments of the method, the network node is a Mobile Station, an MS, the ACK/NACK messages are Packet Uplink ACK/NACKs, PUANs and the data blocks are Radio Link Control, RLC, data blocks.

In embodiments of the method, the predefined TBF mode is the extended uplink TBF mode.

In embodiments of the method, if the MS gets data blocks to transmit while it is in the extended uplink TBF mode, the MS indicates that it has data blocks to transmit by means of including an indication of this in a PDAN for another TBF on which the MS receives data blocks, the PDAN being sent on the Packet Data Channel, the PDCH.

In embodiments of the method, if the MS gets data blocks to transmit while it is in the extended uplink TBF mode, the MS indicates that it has data blocks to transmit by means of an access burst on the Random Access Channel, RACH, of the cell that the MS is in, the access burst comprising information which uniquely identifies the MS in the cell.

In embodiments of the method, if the MS gets data blocks to transmit while it is in the extended uplink TBF mode, the MS indicates that it has data blocks to transmit by means of making a transmission during an uplink radio block period reserved for it on the MS's allocated uplink PDCH resources.

The object is also obtained by means of a method for operating a network node. The method comprises establishing a TBF, a Temporary Block Flow, to another node in the GSM/EDGE network, and the method further comprises entering a receive state in which data blocks are received on said TBF from said other node in the GSM/EDGE network and ACK/NACK messages are transmitted to said other node for data blocks which are received from the other node via said TBF. The method comprises leaving said receive state if positive ACK/NACK messages have been transmitted to said other node for all data blocks received from said other node via said TBF and there are no missing data blocks to receive, and the method further comprises, upon leaving said receive state, starting a timer for the release of said TBF and entering a predefined TBF mode, in which predefined TBF mode the TBF is regarded as being released if the timer expires before additional data blocks are received from said other node on said TBF, while, if in said predefined TBF mode, additional data blocks are received from said other node on said TBF, the method comprises exiting the predefined TBF mode, stopping and resetting the timer and entering the receive state.

In embodiments of the method, the network node is a Base Station Controller, a BSC, the ACK/NACK messages are Packet Uplink ACK/NACKs, PUANs, and the data blocks are Data radio blocks.

In embodiments of the method, the predefined TBF mode is the extended Uplink TBF mode.

In embodiments of the method, the network node is a Mobile Station, an MS, the ACK/NACK messages are Packet Downlink ACK/NACKs, PDANs, and the data blocks are Data radio blocks.

In embodiments of the method, the predefined TBF mode is the delayed downlink TBF release mode.

The object of the invention is also obtained by means of a network node for a GSM/EDGE cellular network. The network node is arranged to establish a Temporary Block Flow, a TBF, to another node in the GSM/EDGE cellular network and to enter a transmit state in which the network node transmits data blocks to said other node via said TBF and receives ACK/NACK messages for transmitted data blocks from said other node. The network node is arranged to leave the transmit state if it does not have data blocks to transmit to said other node and it has received positive ACK/NACK messages from said other node for all transmitted data blocks. The network node is arranged to, upon leaving the transmit state, start and monitor a TBF release timer and to enter a predefined TBF mode in which the network node regards said TBF as being released if the TBF release timer expires before additional data blocks are received by the network node to transmit to said other node, while, if in the predefined TBF mode, additional data blocks are received by the network node to transmit to said other node via said TBF before the TBF release timer has expired, the network node is arranged to exit the predefined TBF mode, stop and reset the TBF release timer and enter the transmit state.

In embodiments, the network node is a Base Station Controller, a BSC, in which the ACK/NACK messages are Packet Downlink ACK/NACKs, PDANs, and the data blocks are Radio Link Control, RLC, data blocks.

In embodiments of the BSC, the predefined TBF mode is the delayed downlink TBF release mode.

In embodiments, the network node is a Mobile Station, an MS, in which the ACK/NACK messages are Packet Uplink ACK/NACKs, PUANs, and the data blocks are Data radio blocks.

In embodiments of the MS, the predefined TBF mode is the extended uplink TBF mode.

In embodiments, the MS is arranged to, when it regards a TBF as being released, stop monitoring a corresponding Packet Downlink Channel, PDCH, for assigned Uplink Status Flags, USFs.

In embodiments, the MS is arranged to, if it gets data blocks to transmit while it is in the extended uplink TBF mode, indicate that it has data blocks to transmit by means of including an indication of this in a PDAN for another TBF on which the MS receives data blocks, the PDAN being sent on the Packet Data Channel, the PDCH.

In embodiments, the MS is arranged to, if it gets data blocks to transmit while it is in the extended uplink TBF mode, indicate that it has data blocks to transmit by means of a radio burst on the Random Access Channel, RACH, of the cell that the MS is in, the radio burst comprising information which uniquely identifies the MS in the cell.

In embodiments, the MS is arranged to, if it gets data blocks to transmit while it is in the extended uplink TBF mode, indicate that it has data blocks to transmit by means of a transmission during a reserved period on the PDCH which the MS is allocated to.

The object of the invention is also obtained by means of a network node for a GSM/EDGE cellular network. The network node is arranged to establish a Temporary Block Flow, a TBF, to another node in the GSM/EDGE cellular network and to enter a receive state in which the network node receives data blocks on said TBF from said other node in the GSM/EDGE cellular network and transmits ACK/NACK messages to said other node for data blocks which are received on said TBF from said other node. The network node is arranged to leave the receive state if it has transmitted positive ACK/NACK messages to said other node for all data blocks which have been received from said other node on said TBF and if there are no missing data blocks for the network node to receive. The network node is arranged to, upon leaving the receive state, start and monitor a timer for the release of said TBF and to enter a predefined TBF mode, in which the network node regards the TBF as being released if the timer expires before additional data blocks are received from said other node on said TBF, while, if in said predefined TBF mode, additional data blocks are received from said other node on said TBF, the network node is arranged to exit the predefined TBF mode, and to stop and reset the timer and entering the receive state.

In embodiments, the network node is a Base Station Controller, a BSC, in which the ACK/NACK messages are Packet Uplink ACK/NACKs, PUANs, and the data blocks are Data radio blocks.

In embodiments of the BSC, the predefined TBF mode is the extended Uplink TBF mode.

In embodiments, the network node is a Mobile Station, an MS, in which the ACK/NACK messages are Packet Downlink ACK/NACKs, PDANs, and the data blocks are Data radio blocks.

In embodiments of the MS, the predefined TBF mode is the delayed downlink TBF release mode.

BRIEF DESCRIPTION OF THE DRAWINGS

The invention will be described in more detail in the following, with reference to the appended drawings, in which.

DETAILED DESCRIPTION

Figure 1:
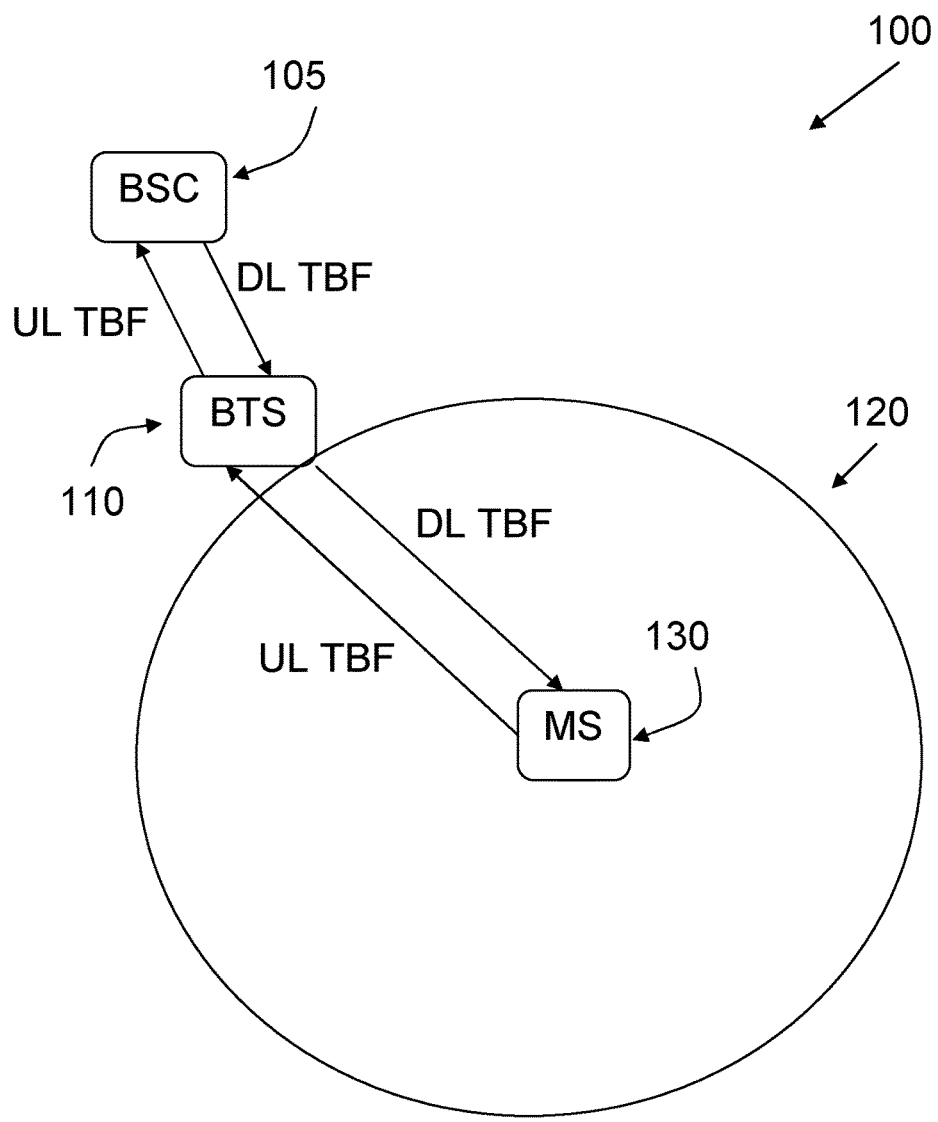
FIG. 1 shows a GSM/EDGE system.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

In order to facilitate the understanding of the invention, a short description will first be given of some functions in a GSM/EDGE network with reference to FIG. 1. FIG. 1 shows a part of a GSM/EDGE network 100, in which there is comprised a cell 120, in which cell 120 there is a Mobile Station, MS, 130. Naturally, a GSM/EDGE network can comprise a large number of cells, and one cell can accommodate more than one MS, so the number of cells and MSs shown in FIG. 1 are an example only. In addition, it should be pointed out that the term "Mobile Station" is here used in a generic manner, intended to signify all devices in a GSM/EDGE system which communicate wirelessly with the BTS (as well as with the BSC via the BTS). Non-exclusive examples of such devices are mobile telephones, PCs, reading tablets etc. In addition, in spite of the word "Mobile" in the term "Mobile Station", examples of MSs in the sense that the word is used here also include stationary devices such as, for example, utility meters (water, electricity, etc.), parking meters, home alarms such as burglar alarms, etc.

As shown in FIG. 1, for the cell 120, there is also a Base Transceiver Station, a BTS 110, and a Base Station Controller, a BSC 105. The combination of a BTS and a BSC is sometimes referred to as a BSS, Base Station Subsystem.

All traffic to/from the MS 130 in the cell 120 is routed via the BTS 110, and the function of the BTS 110 is to a large extent controlled by the BSC 105.

In a GSM/EDGE system such as the one 100 in FIG. 1, traffic is sent as Radio Link Control, RLC, data blocks, for which purpose so called Temporary Block Flows, TBF:s, are established between the BSS and the MS, usually between the BSC and the MS. In order for RLC data blocks to be transmitted in the downlink, DL, direction, a DL TBF needs to be established between the BSC and the MS, and similarly, in order for RLC data blocks to be transmitted in the uplink, UL, direction, a UL TBF needs to be established between the MS and the BSC. Both an UL TBF and a DL TBF are indicated in FIG. 1.

When the need for a certain TBF ceases, a number of control messages will be exchanged between the BSC and the corresponding MS in order for that TBF to be released. A TBF, regardless of whether it is a DL TBF or a UL TBF, needs to be released at both of its "ends", i.e. both at the BSC and the MS.

Below, embodiments of a method and a device will be shown by means of which DL and UL TBFs can be released with reduced use of control signaling.

Figure 2:
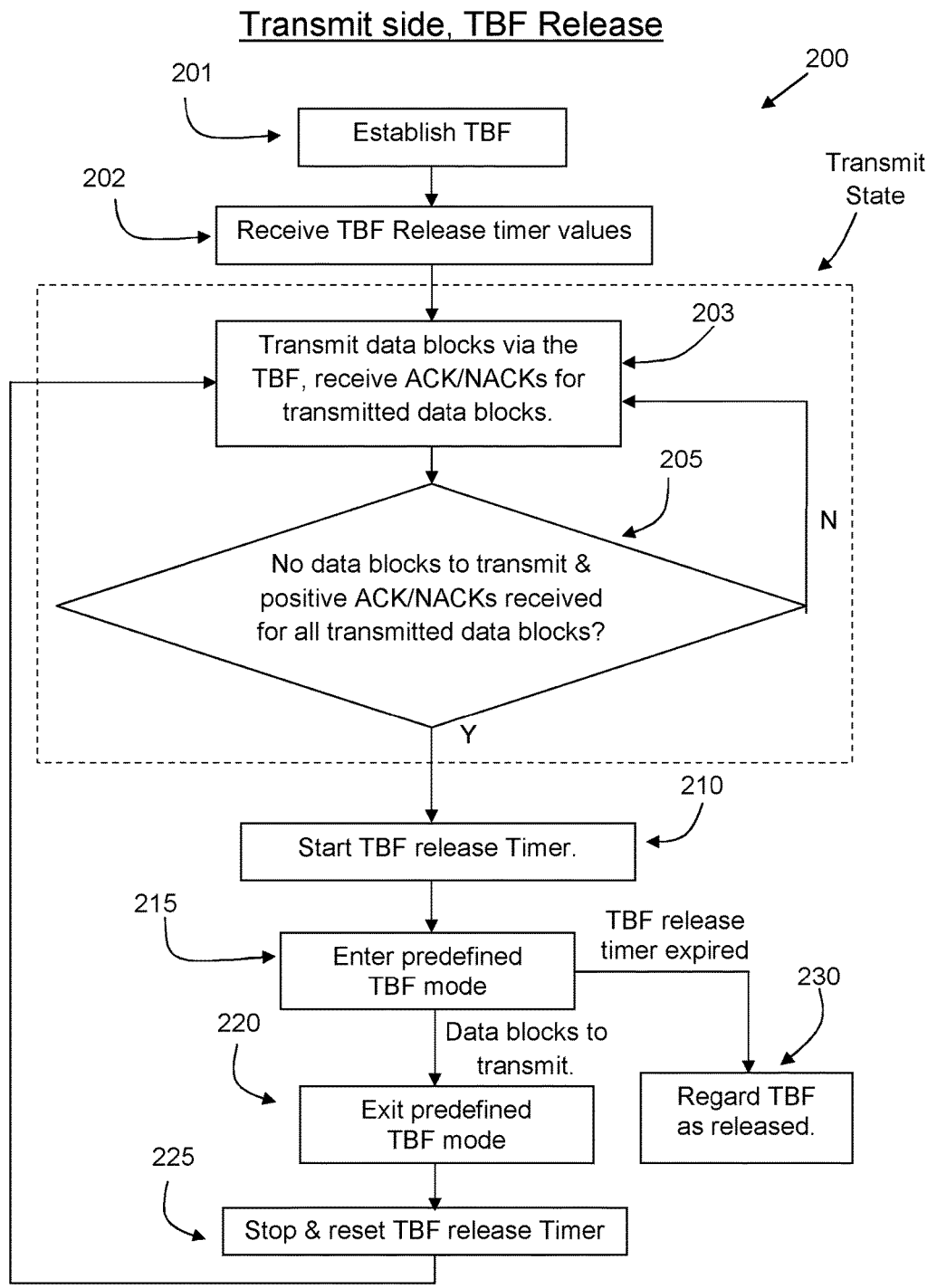
FIG. 2 shows a general flowchart for the release of a TBF from a transmitting node.

Since there can be both UL TBFs and DL TBFs, both the MS and the BSC can be a transmitting party on a TBF. FIG. 2 shows a schematic flow chart of a method 200 for how such a generalized transmitting party (i.e. either an MS or a BSC) in a GSM/EDGE network can release a TBF on which it transmits data blocks with reduced use of control signaling. Following the description of the generalized method 200, descriptions will be given of more detailed methods where the transmitting party is a BSC and an MS, respectively. Since the transmitting party of FIG. 2 can be either an MS or a BSC, the transmitting party will be described as a "network node" in the description below of FIG. 2.

Initially, the network node establishes a TBF to another node in the GSM/EDGE system, i.e. a receiving network node. This is indicated in step 201. In the method 200, a TBF Release timer is used, as will be described in more detail later. In some embodiments of the method 200, values to be used with the TBF Release timer, usually threshold values for the timer, are received from the GSM/EDGE network upon establishing the TBF, as is indicated in step 202.

As shown, the method 200 also comprises entering a transmit state, in which the network node, as shown in step 203, transmits data blocks, suitably RLC data blocks, via the TBF to the receiving network node, and receives ACK/NACKs from the receiving network node for transmitted data blocks. It should be pointed out that the ACK/NACKs are not received on the same TBF as the one on which the data blocks are transmitted; the TBF which will be released by means of the method shown in FIG. 200 is the TBF used by the network node in order to transmit data blocks.

As shown in step 205, the network node is arranged to, in the transmit state, continuously check if it has data blocks to transmit via the TBF to the receiving network node and if positive ACK/NACKs have been received from the receiving network node for all of the data blocks which have been transmitted to it. As indicated in step 205 of FIG. 2, if there are data blocks to transmit or if positive ACK/NACKs have not been received from the receiving node for all transmitted data blocks, step 203 is performed again, i.e. remaining data blocks are transmitted and/or data blocks for which negative ACK/NACKS have been received are retransmitted, and ACK/NACKs are received for transmitted data blocks. As is also indicated in step 205 of FIG. 2, if there are no data blocks to transmit and if positive ACK/NACKs have been received from the receiving node for all transmitted data blocks, the network node exits the transmit state.

As indicated in step 210, upon leaving the transmit state, the network node starts the TBF Release timer which was mentioned previously, and enters a predefined TBF mode, step 215. In the predefined TBF mode, the network node monitors the value of the TBF release timer: the TBF release timer can either function as a countdown to a predefined threshold value, e.g. zero, or a count up to a predetermined threshold value. If the TBF release timer reaches the predetermined threshold value, i.e. the TBF release timer expires, before any data blocks have been received by the network node for transmission to the receiving node, the network node considers the TBF as being released, step 230, i.e. the TBF is terminated. If, on the other hand, data blocks are received by the network node for transmission to the receiving node before the TBF release timer expires, the network node exits from the predetermined TBF mode, step 220, and stops and resets the TBF release timer, as shown in step 225, and re-enters the transmit state. The resetting of the TBF release timer of step 225 is suitably to an initial value, e.g. zero in the case of a TBF release timer which counts upwards, or to another initial value in the case of a TBF release timer which counts down. The timer values which are received in step 202 are suitably the values from which the TBF release timer counts down, or the value to which it counts up, depending on the sort of TBF Release timer.

Figure 3:
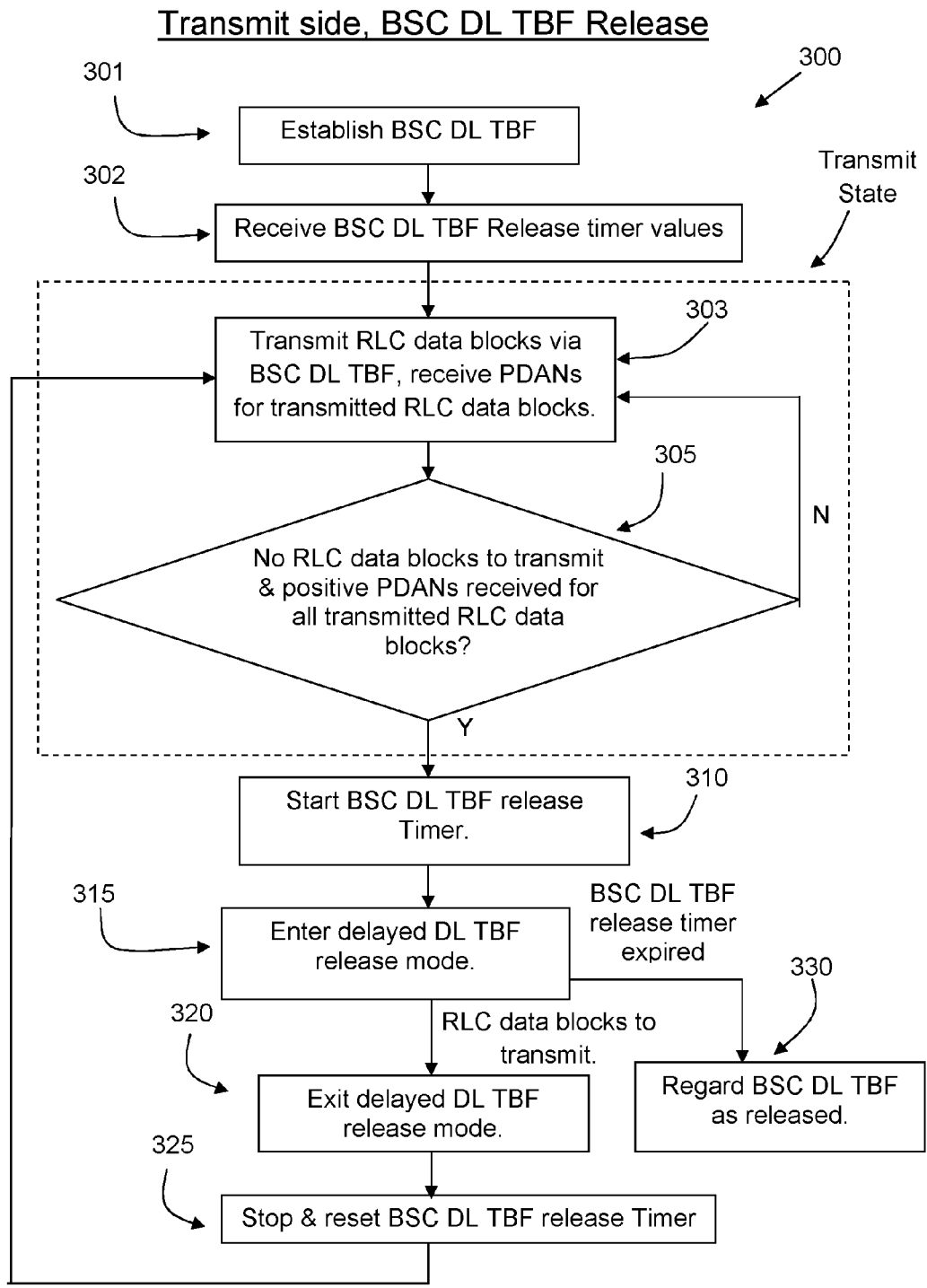
FIGS. 3 and 4 show embodiments of the flowchart of FIG. 2.
Figure 4:
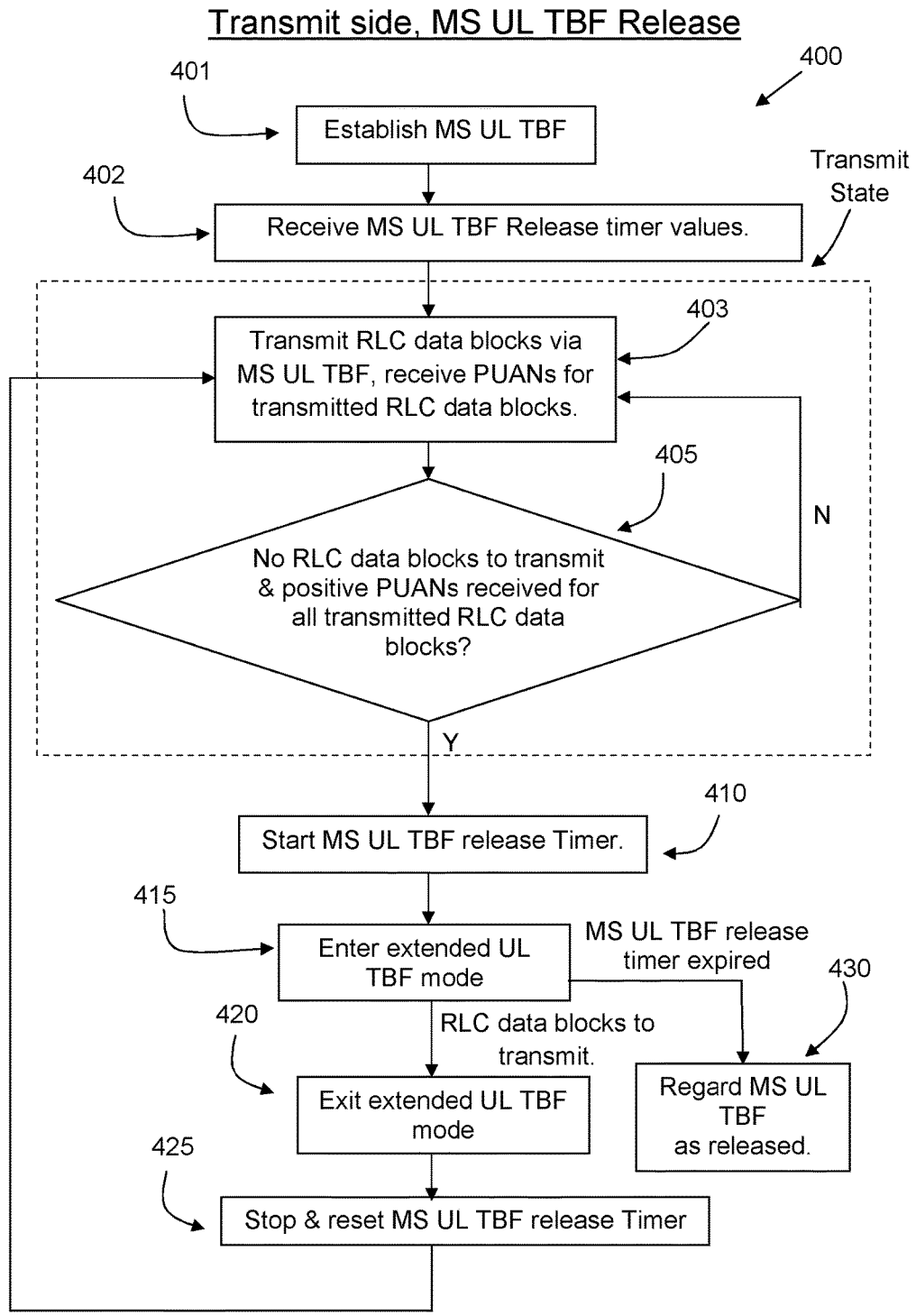

As mentioned above, the network node to which the method 200 of FIG. 2 can be applied can in embodiments be either an MS or a BSC. The method 200 shows the case of a network node which transmits data blocks and receives ACK/NACKs for the transmitted data blocks, which means that the network node is a BSC in the DL case and an MS in the UL case. FIGS. 3 and 4 show details of the method 200 which are employed in these two cases, e.g. a BSC (FIG. 3) or an MS (FIG. 4) as the network node of FIG. 2. In order to facilitate the comparison of FIGS. 3 and 4 with FIG. 2, all steps shown in FIGS. 3 and 4 have been given the same last two digits, with the first digit differing according to the number of the figure, so that, for example, step 215 of FIG. 2 corresponds to step 315 of FIG. 3 and step 415 of FIG. 4.

Since the general method 200 of FIG. 2 has been described above, the more specific methods of FIGS. 3 and 4 will not be described as extensively in the following.

However, turning now to FIG. 3 which shows a method 300 for use in a BSC when releasing a DL TBF, we can see the following: In step 301, the TBF which is established to another node in the GSM/EDGE system, i.e. a receiving network node, is a BSC DL TBF, and the values which are received in step 302 are values for the BSC DL TBF. Suitably, the receiving network node is an MS, so that the DL BSC-MS configuration becomes the one shown in FIG. 1 between the BSC 105 and the MS 130, through the BTS 110. In steps 303 and 305, the data blocks are specified as being RLC data blocks, and the ACK/NACKs are PDANs, Packet Downlink ACK/NACKs.

In step 310, the TBF release timer which is started is a BSC DL TBF release timer, and in steps 315 and 320, the predefined TBF mode is specified as being the delayed DL TBF release mode. In step 325, in congruence with step 310, the TBF release Timer is specified as being a BSC DL TBF release Timer.

FIG. 4 shows a method 400 for use in an MS when releasing an UL TBF. In FIG. 4, we can see the following: In step 401, the TBF which is established to another node in the GSM/EDGE system, i.e. a receiving network node, is an MS UL TBF, and the values which are received in step 402 are values for the MS UL TBF. Suitably, the receiving network node is a BSC, so that the UL MS-BSC configuration becomes the one shown in FIG. 1 between the BSC 105 and the MS 130, through the BTS 110. In steps 403 and 405, the data blocks are specified as being RLC data blocks, and the ACK/NACKs are PUANs, Packet Uplink ACK/NACKs.

In step 410, the TBF release timer which is started is an MS UL TBF release timer, and in steps 415 and 420, the predefined TBF mode is specified as being the extended UL TBF mode. In step 425, in congruence with step 410, the TBF release Timer is specified as being an MS UL TBF release Timer. In step 430, when the MS regards the UL TBF as being released, the MS stops monitoring the corresponding PDCHs. Packet Data Channels, for assigned USFs, Uplink Status Flags.

Returning now to step 405, if, in this step, the MS sees that it has received more RLC data blocks to transmit to the BSC via the TBF, the MS can proceed in a number of ways, as described below:

If there is an ongoing DL TBF where the GSM/EDGE network, here in the form of a BSC, sends downlink data in acknowledged mode (hence requiring the transmission of a PDAN in the uplink) the MS can indicate that it has RLC data blocks to send in the uplink by including an appropriate indicator (e.g. by redefining the use of a spare bit) in the MS's PDAN on the PDCH.

If there is no ongoing DL TBF to the MS, e.g. the MS is in Idlemode with the Non-DRX mode timer running, the MS can indicate that it has RLC data blocks to send in the uplink by sending a data indication single burst radio block on the cell's RACH, Random Access Channel. Such a radio block would use the same coding rate as an ordinary RACH radio block, but with the difference that it consists of the same bit length as an"legacy Normal" Burst, as defined in 3GPP TS 45.002. This is possible since the MS has recently had an UL TBF (i.e. since the Non-DRX mode timer is still running), which means that the MS is synchronized to the cell, which eliminates the need to use the shorter RACH-burst known as Access Burst (AB), see 3GPP TS 45.002. The coding rate will be the same as that used for RACH radio blocks, which will give a payload size of 21 bits. By omitting inclusion of the BTS "color code" bits (normally included as part of the BSIC in a RACH burst) which normally are XORed with 3 of the 6 parity check bits (see 3GPP TS 45.003 for the AB coding details) of a RACH burst, an additional 3 bits can be included, summing up to a total payload size of 24 bits which is equivalent of the length of the MS TLLI. (Suitably, a new Training Sequence Code (TSC) is added, so that the BTS can distinguish this burst format from other burst formats.) As a TLLI is unique for an MS, the BSC can upon reception determine which MS it is that is indicating that it has Data radio blocks to transmit.

There could also be introduced a "fast feedback channel", here denoted FBCH, on the PDCH that the MS is allocated on. This would require the BSC to periodically reserve a radio block period on the uplink, either by reserving a USF-value for this or by letting such a radio block period occur periodically. In such an embodiment, for example using Code Division Multiplexing, multiple MSs could transmit simultaneously (e.g. using different parts of the same burst), indicating that they have Dataradio blocks to transmit, and the BSC can determine which MSs that transmitted during this radio block period, and thereby determine which MSs have uplink Data radio blocks to transmit. If the BSC receives an indication that an MS has Data radio blocks to transmit, the BSC makes this MS eligible for uplink scheduling. Once an MS is scheduled on the uplink, receives an USF and transmits uplink Data radio blocks, the MS leaves the extended UL TBF mode, stops and resets its uplink TBF release timer.

Figure 5:
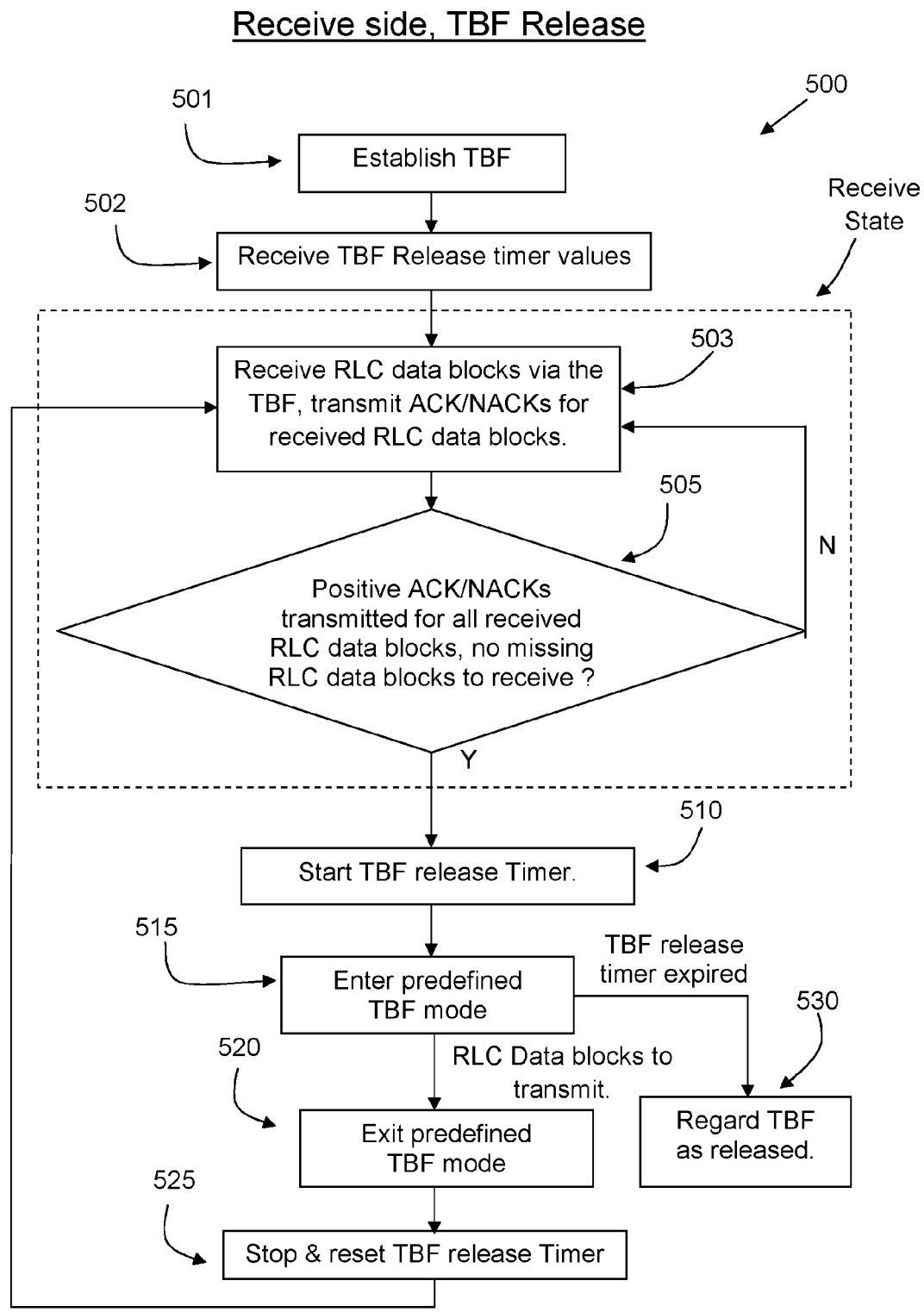
FIG. 5 shows a general flowchart for the release of a TBF from a receiving node.

FIGS. 2-4 have shown the cases of a network node such as an MS and a BSC being transmitting (i.e. transmitting data blocks) network nodes on a TBF. However, since there be both UL and DL TBFs, both an MS and a BSC can also be receiving (i.e. receiving data blocks) network nodes on a TBF. The receiving network node receives data blocks on the TBF and thus transmits ACK/NACKs for those data blocks to the transmitting network nodes, although, as pointed out previously, an ACK/NACK for a data block is not transmitted on the TBF on which the data block was received. FIG. 5 shows a schematic flow chart of a method 500 for how a generalized receiving network node, e.g. an MS (in DL) or a BSC (in UL) in a GSM/EDGE network can release a TBF on which it receives data blocks with reduced use of control signaling. Following the description of the generalized method 500, more detailed descriptions will be given of methods where the receiving network node is a BSC and an MS, respectively.

As shown in FIG. 5, the method 500 comprising establishing a TBF to another node in the GSM/EDGE network, and, in embodiments, values to be used with the TBF Release timer, usually threshold values for the timer, are received from the GSM/EDGE network upon establishing the TBF, as is indicated in step 502.

As shown in FIG. 5, the method 500 comprises entering a receive state in which, step 503, the network node receives data blocks on the TBF which was established to the other node. In the receive state, step 503, the network node transmits ACK/NACK messages to the other node for data blocks which are received via the TBF from the other node.

As shown in step 505, the network node is arranged to, in the transmit state, continuously check if it has transmitted positive ACK/NACK messages to the other node for all data blocks which have been received from the other node via the TBF and to also continuously check if there are missing data blocks to receive, which can be detected for example, by means of sequence numbers of the received data blocks. If positive ACK/NACK messages have not been transmitted to the other node for all data blocks which have been received from the other node via the TBF or if there are missing data blocks to receive, the method reverts to step 503, i.e. receiving data blocks and transmitting ACK/NACKs to the other node for data blocks which have been received.

However, if, as also indicated in step 505, positive ACK/NACK messages have been transmitted to the other node for all data blocks which have been received from the other node via the TBF and there are no missing data blocks to receive, the network node according to the method 500 exits the receive state and, as shown in step 510, starts a timer for the release of the TBF and enters, step 515, a predefined TBF mode.

Thus, as indicated in step 510, upon leaving the receive state, the network node starts the TBF Release timer which was mentioned previously, and enters a predefined TBF mode, step 515. In the predefined TBF mode, the network node monitors the value of the TBF release timer: the TBF release timer can either function as a countdown to a predefined threshold value, e.g. zero, or a count up to a predetermined threshold value. If the TBF release timer reaches the predetermined threshold value, i.e. the TBF release timer "expires" before any data blocks have been received by the network node from the other node, the network node considers the TBF as being released, step 530, i.e. the TBF is terminated by the network node. If, on the other hand, data blocks are received by the network node from the other node before the TBF release timer expires, the network node exits from the predetermined TBF mode, step 520, and stops and resets the TBF release timer, as shown in step 525, and enters the receive state. The resetting of the TBF release timer in step 525 is suitably to an initial value, e.g. zero in the case of a TBF release timer which counts upwards, or to another initial value in the case of a TBF release timer which counts down. The timer values which are received in step 502 are suitably the values from which the TBF release timer counts down, or the value to which it counts up, depending on the nature of the TBF Release timer, i.e. "Countdown" or "Count-up".

Figure 6:
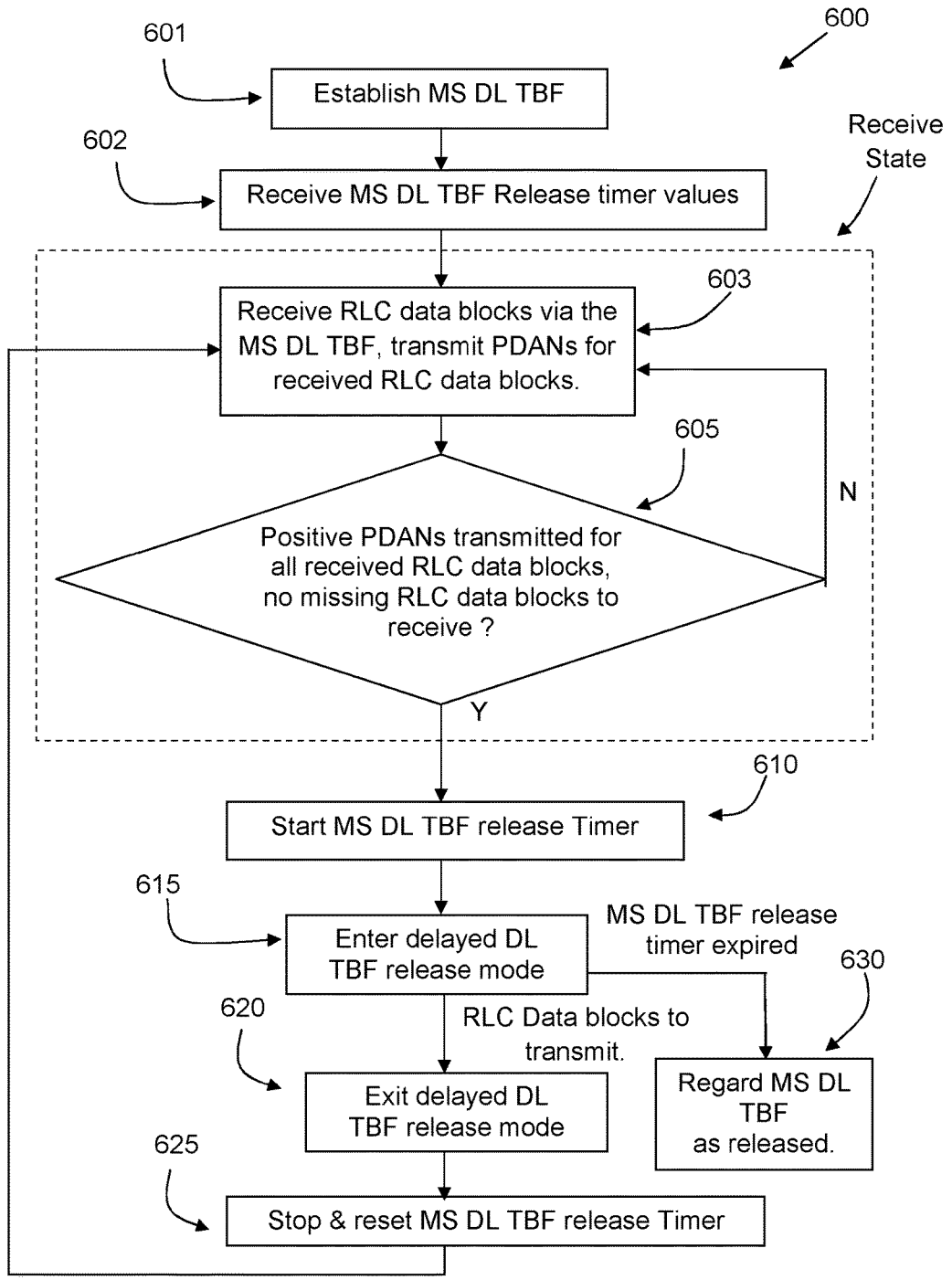
FIGS. 6 and 7 show embodiments of the flowchart of FIG. 5.
Figure 7:
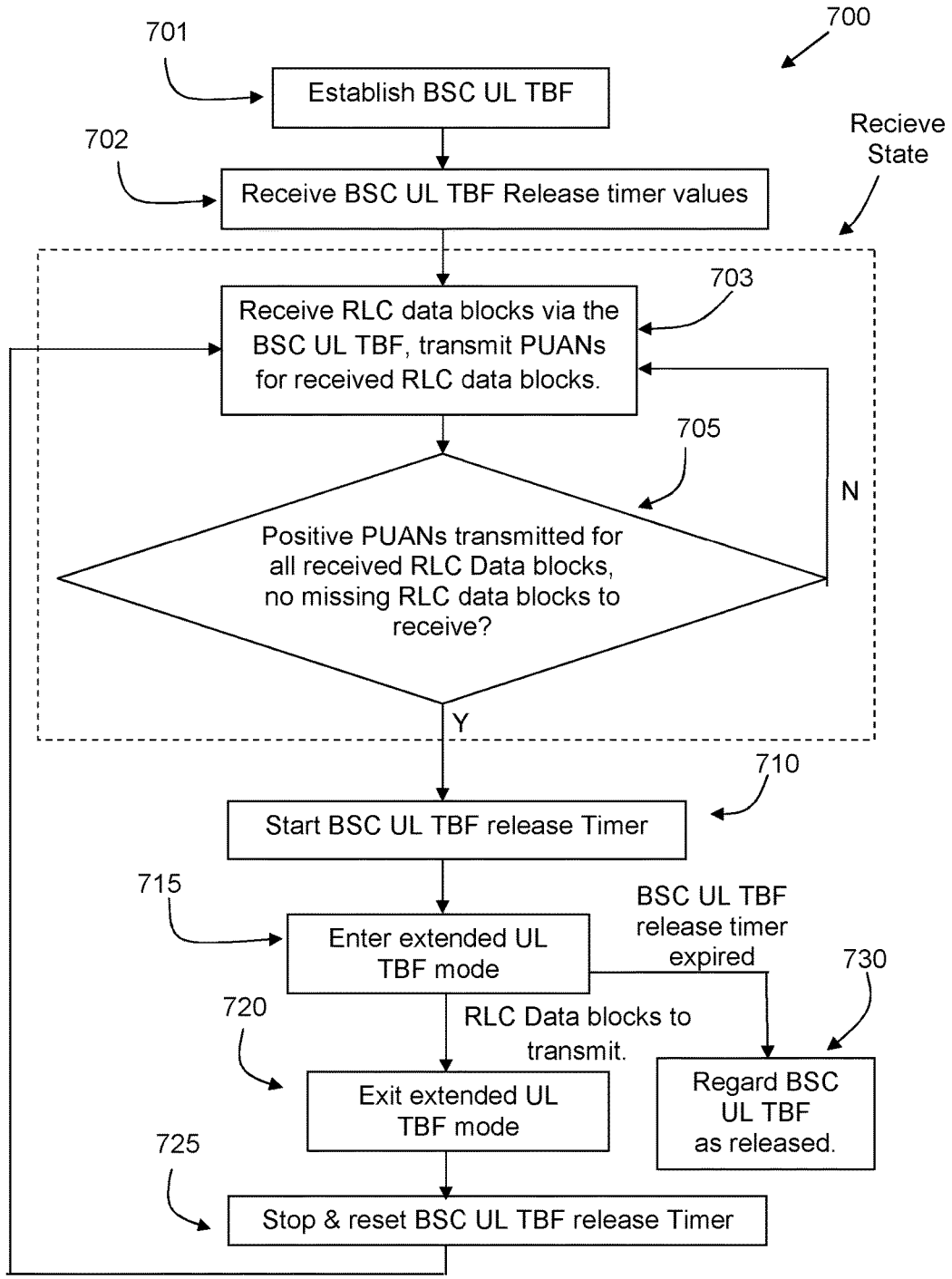

As mentioned above, the network node to which the method 500 of FIG. 5 can be applied can in embodiments be either an MS or a BSC. The method 500 shows the case of a network node which receives data blocks and transmits ACK/NACKs for the received data blocks, which means that the network node is a BSC in the UL case and an MS in the DL case. FIGS. 6 and 7 show details of the method 500 which are employed in these two cases, e.g. a BSC (FIG. 6) or an MS (FIG. 7) as the network node of FIG. 5. In order to facilitate comparison of FIGS. 6 and 7 with FIG. 5, all steps shown in FIGS. 6 and 7 have been given the same last two digits, with the first digit differing according to the number of the figure, so that, for example, step 515 of FIG. 5 corresponds to step 615 of FIG. 6 and step 715 of FIG. 7.

Since the general method 500 of FIG. 5 has been described above, the more specific methods of FIGS. 6 and 7 will not be described as extensively in the following.

However, turning now to FIG. 6 which shows a method 600 for use in an MS when releasing a DL TBF, we can see the following: In step 601, the TBF which is established to another node in the GSM/EDGE system, i.e. to a transmitting network node, is an MS DL TBF, and the values which are received in step 602 are values for the MS DL TBF. Suitably, the transmitting network node is a BSC, so that the DL MS-BSC configuration becomes the one shown in FIG. 1 between the BSC 105 and the MS 130, through the BTS 110. In steps 603 and 605, it is shown that the data blocks are RLC data blocks and the ACK/NACKs are PDANs, Packet Downlink ACK/NACKs.

In step 610, the TBF release timer which is started is an MS DL TBF release timer, and in steps 615 and 620, the predefined TBF mode is specified as being the delayed DL TBF release mode. In step 625, in congruence with step 610, the TBF release Timer is specified as being an MS DL TBF release Timer.

FIG. 7 shows a method 700 for use in a BSC when releasing an UL TBF. In FIG. 7, we can see the following: In step 701, the TBF which is established to another node in the GSM/EDGE system, i.e. a transmitting network node, is a BSC UL TBF, and the values which are received in step 702 are values for the BSC UL TBF. Suitably, the transmitting network node is a BSC, so that the UL BSC-MS configuration becomes the one shown in FIG. 1 between the BSC 105 and the MS 130, through the BTS 110. In steps 703 and 705, the data blocks are specified as being RLC data blocks, and the ACK/NACKs are PUANs, Packet Uplink ACK/NACKs.

In step 710, the TBF release timer which is started is a BSC UL TBF release timer, and in steps 715 and 720, the predefined TBF mode is specified as being the extended UL TBF mode. In step 725, in congruence with step 710, the TBF release Timer is specified as being a BSC UL TBF release Timer.

Figure 8:
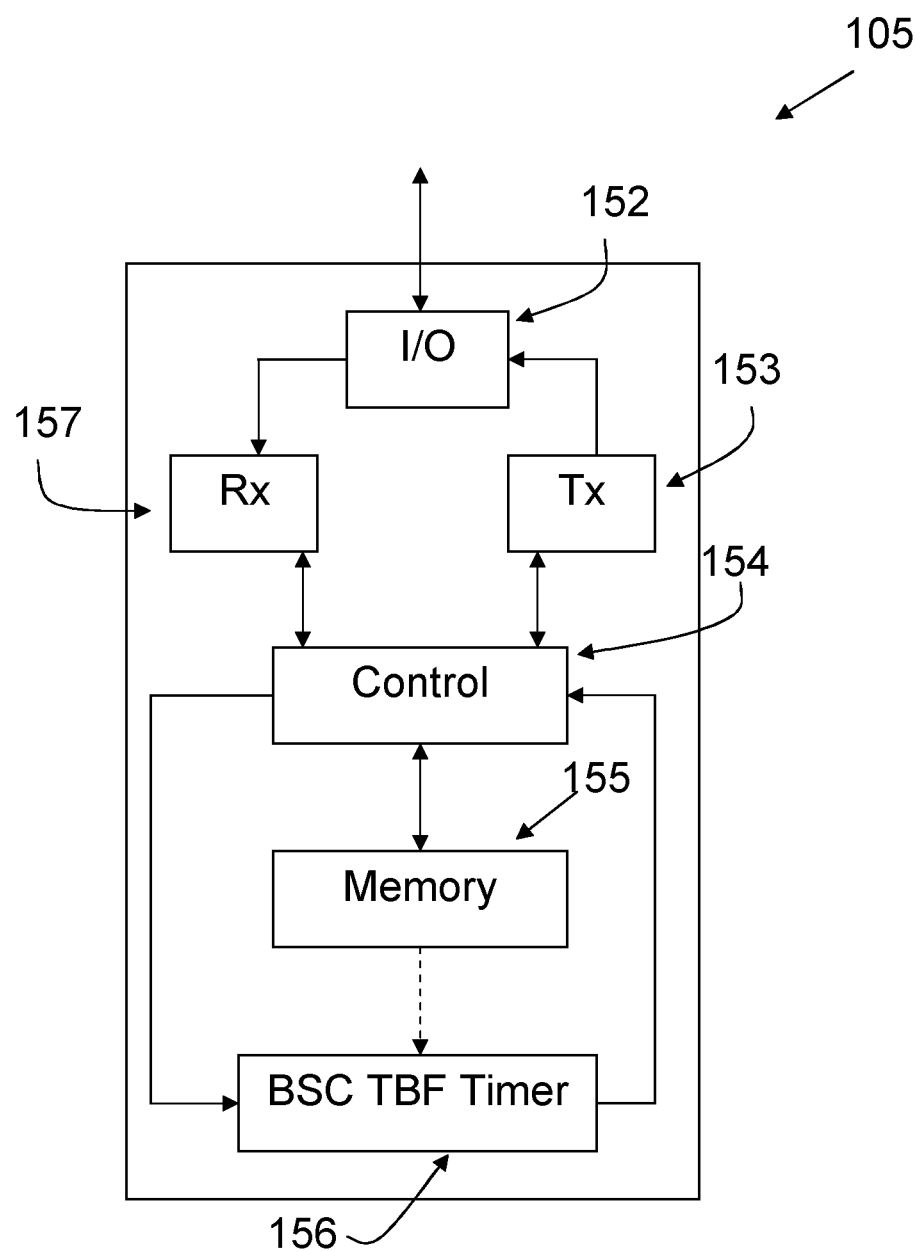
FIG. 8 shows a block diagram of a BSC.

FIG. 8 shows a basic block diagram of a BSC 105 which is arranged to performing the methods described above which pertain to a BSC. As shown in FIG. 8, the BSC 105 comprises an I/O-unit 152. The I/O-unit 152 is connected to a receive unit, Rx 157, and a transmit unit Tx 153, and by means of these units, i.e. the I/O-unit, the Tx unit and the Rx unit, the BSC communicates with other nodes in the GSM/EDGE system, e.g. BTSs. The function of the receive unit, Rx 157 and the transmit unit Tx 153 is controlled by a control unit 154, aided by a memory unit 155. In order to monitor, run, and possibly also to initiate the BSC TBF Timer, there is comprised a BSC TBF Timer unit 156, which can also be a part of the control unit 154. By means of the I/O-unit 152 and the transmit 153 and receive 157 units, the BSC 105 communicates with other nodes in the system, such as the MS and the BTS.

Figure 9:
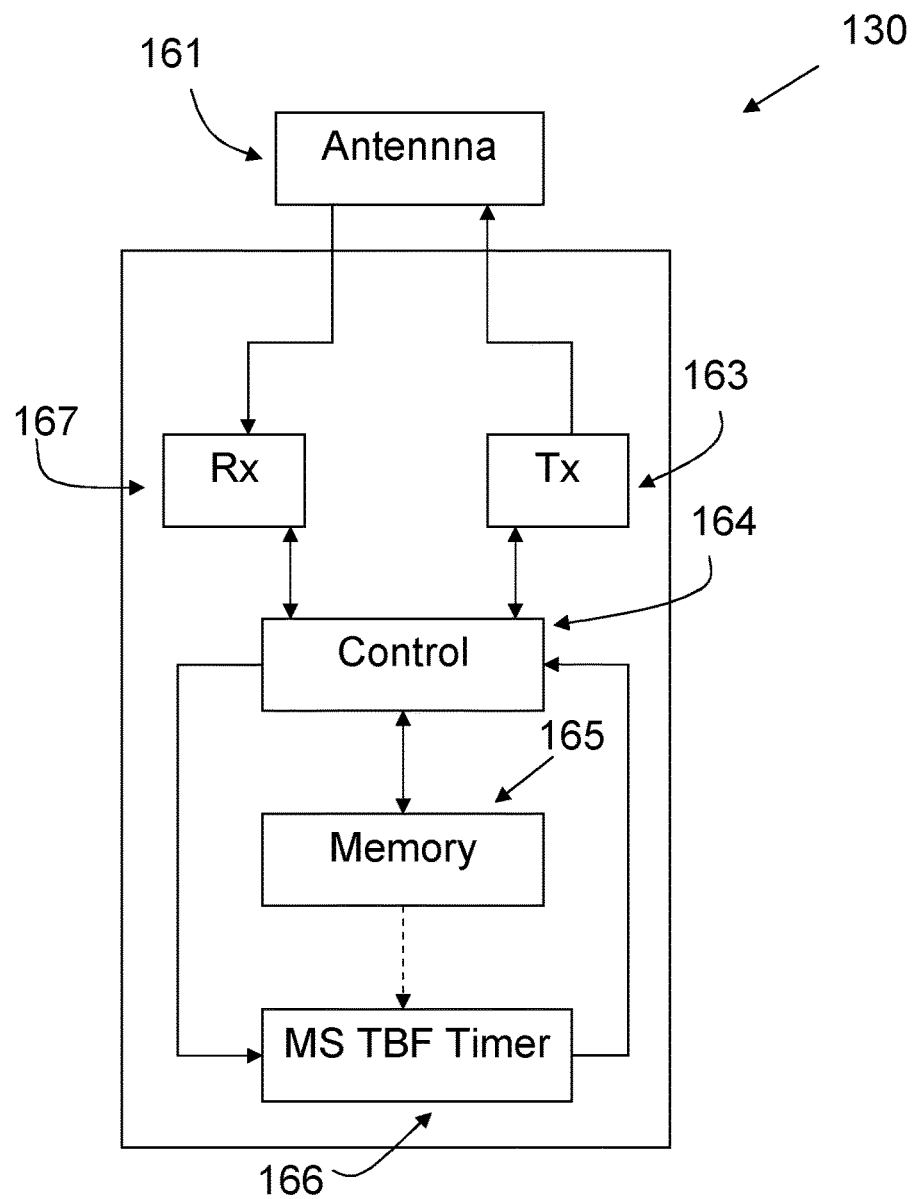
FIG. 9 shows a block diagram of an MS.

FIG. 9 shows a basic block diagram of an MS 130 which is arranged to perform the methods described above which pertain to an MS. As shown in FIG. 9, the MS 130 comprises an antenna unit 161 connected to a receive unit, Rx 167 and a transmit unit Tx 163. The function of the receive unit, Rx 167 and the transmit unit Tx 163 is controlled by a control unit 164, aided by a memory unit 165. In order to monitor and possibly also initiate the MS TBF Timer, there is comprised an MS TBF Timer unit 166, which can also be a part of the control unit 164. By means of the antenna unit 161, the transmit 163 and receive 167 units, the MS 130 communicates with other nodes in the system, such as the BTS and also with the BSC through the BTS.

In the MS's 130 and BSC's 105 role as a network node which transmits data blocks and receives ACK/NACKS, the network node, i.e. the BSC/MS is arranged to establish a Temporary Block Flow, a TBF, to another network node in the GSM/EDGE cellular network and to enter a transmit state in which the network node transmits data blocks to the other network node via said TBF and receives ACK/NACK messages for transmitted data blocks from the other network node. The BSC/MS is arranged to leave the transmit state if it does not have data blocks to transmit to the other node and it has received positive ACK/NACK messages from the other node for all transmitted data blocks.

The network node is arranged to, upon leaving said transmit state, start and monitor a TBF release timer and to enter a predefined TBF mode in which the network node regards said TBF as being released if the TBF release timer expires before additional data blocks are received by the network node to transmit to the other node, while, if in said predefined TBF mode, additional data blocks are received by the network node to transmit to the receiving node via said TBF before the TBF release timer has expired, the network node is arranged to exit the predefined TBF mode, and to stop and reset the TBF release timer and to enter the transmit state.

In the BSC 105, it is the I/O-unit 152, the transmit unit 153, the control unit 154 and the receive unit 157 which handle the establishing of a TBF to another node. Transmissions, e.g. of data blocks, are handled by the I/O-unit 152, the transmit unit 153 and the control unit 154, and reception, e.g. of ACK/NACKs, is handled by the I/O-unit 152, the control unit 154 and the receive unit 157. Entering and exiting the transmit state is handled by the control unit 154, as is the starting, stopping, resetting and monitoring of the TBF timer unit 156.

In the MS 130, it is the antenna unit 161, the transmit unit 163, the control unit 164 and the receive unit 167 which handle the establishing of a TBF to another node. Transmissions, e.g. of data blocks, are handled by the antenna unit 161, the transmit unit 163 and the control unit 164, and reception, e.g. of ACK/NACKs, is handled by the antenna unit 161, the control unit 164 and the receive unit 167. Entering and exiting the transmit state is handled by the control unit 164, as is the starting, stopping, resetting and monitoring of the TBF timer unit 166.

In the BSC's 105 and the MS's 130 role as a network node which receives data blocks and transmits ACK/NACKs for received data blocks, the BSC/MS is arranged to establish a Temporary Block Flow, a TBF, to another node in the GSM/EDGE cellular network and to enter a receive state in which the network node receives data blocks on said TBF from the other node in the GSM/EDGE cellular network and transmits ACK/NACK messages to the other node for data blocks which are received on said TBF from the other node.

The BSC/MS is arranged to leave the receive state if it has transmitted positive ACK/NACK messages to the other node for all data blocks which have been received from said other node on said TBF and there are no missing data blocks for the network node to receive. The BSC/MS is arranged to, upon leaving the receive state, start and monitor a timer for the release of said TBF and to enter a predefined TBF mode, in which the network node regards the TBF as being released if the timer expires before additional data blocks are received from said transmitting node on said TBF, while, if in said predefined TBF mode, additional data blocks are received from said other node on said TBF, the network node is arranged to exit the predefined TBF mode and to stop and reset the timer and to enter the receive state.

In the BSC 105, it is the I/O-unit 152, the transmit unit 153, the control unit 154 and the receive unit 157 which handle the establishing of a TBF to another node. Transmissions, e.g. of ACK/NACKs, are handled by the I/O-unit 152, the transmit unit 153 and the control unit 154, and reception, e.g. of data blocks, is handled by the I/O-unit 152, the control unit 154 and the receive unit 157. Entering and exiting the receive state is handled by the control unit 154, as is the starting, stopping, resetting and monitoring of the TBF timer unit 156.

In the MS 130, it is the antenna unit 161, the transmit unit 163, the control unit 164 and the receive unit 167 which handle the establishing of a TBF to another node. Transmissions, e.g. of ACK/NACKs, are handled by the antenna unit 161, the transmit unit 163 and the control unit 164, and reception, e.g. of data blocks, is handled by the antenna unit 161, the control unit 164 and the receive unit 167. Entering and exiting the transmit state is handled by the control unit 164, as is the starting, stopping, resetting and monitoring of the TBF timer unit 166.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A method for operating a network node in a Global System for Mobile Communications/Enhanced Data for GSM Evolution (GSM/EDGE) network, the method comprising:
 establishing a Temporary Block Flow (TBF) to another node in the GSM/EDGE network;
 entering a transmit state in which data blocks are transmitted via said TBF to said other node and ACK/NACKs are received from said other node for transmitted data blocks;
 leaving the transmit state if there are no data blocks to transmit to said other node and positive ACK/NACKs have been received from the other node for all transmitted data blocks;
 upon leaving said transmit state, starting a timer for the release of said TBF and entering a predefined TBF mode, in which predefined TBF mode the TBF is regarded as being released if the TBF release timer expires before additional data blocks are received by the network node to transmit to said other node; and
 if, while in said predefined TBF mode, additional data blocks are received by the network node to transmit to said other node via said TBF before the timer has expired, exiting the predefined TBF mode, stopping and resetting the timer, and entering the transmit state;
 wherein the network node is a Mobile Station (MS), the ACK/NACK messages are Packet Uplink ACK/

NACKs (PUANs) and the data blocks are Radio Link Control (RLC) data blocks; and wherein, if the MS gets data blocks to transmit while it is in the extended uplink TBF mode, the MS indicates that it has data blocks to transmit by means of including an indication of this in a Packet Downlink ACK/NACK (PDAN) for another TBF on which the MS receives data blocks, the PDAN being sent on the Packet Data Channel (PDCH).

2. A method for operating a network node in a Global System for Mobile Communications/Enhanced Data for GSM Evolution (GSM/EDGE) network, the method comprising:

establishing a Temporary Block Flow (TBF) to another node in the GSM/EDGE network;

entering a transmit state in which data blocks are transmitted via said TBF to said other node and ACK/NACKs are received from said other node for transmitted data blocks;

leaving the transmit state if there are no data blocks to transmit to said other node and positive ACK/NACKs have been received from the other node for all transmitted data blocks;

upon leaving said transmit state, starting a timer for the release of said TBF and entering a predefined TBF mode, in which predefined TBF mode the TBF is regarded as being released if the TBF release timer expires before additional data blocks are received by the network node to transmit to said other node; and if, while in said predefined TBF mode, additional data blocks are received by the network node to transmit to said other node via said TBF before the timer has expired, exiting the predefined TBF mode, stopping and resetting the timer, and entering the transmit state;

wherein the network node is a Mobile Station (MS), the ACK/NACK messages are Packet Uplink ACK/NACKs (PUANs) and the data blocks are Radio Link Control (RLC) data blocks; and wherein, if the MS gets data blocks to transmit while it is in the extended uplink TBF mode, the MS indicates that it has data blocks to transmit by means of an access burst on the Random Access Channel (RACH) of the cell that the MS is in, the access burst comprising information which uniquely identifies the MS in the cell.

3. A network node for a Global System for Mobile Communications/Enhanced Data for GSM Evolution (GSM/EDGE) cellular network, the network node comprising a processor and associated memory and being configured to:

establish a Temporary Block Flow (TBF) to another node in the GSM/EDGE cellular network and to enter a transmit state in which the network node transmits data blocks to said other node via said TBF and receives ACK/NACK messages for transmitted data blocks from said other node;

leave said transmit state if the network node does not have data blocks to transmit to said other node and has received positive ACK/NACK messages from said other node for all transmitted data blocks;

upon leaving said transmit state, start and monitor a TBF release timer and to enter a predefined TBF mode in which the network node regards said TBF as being released if the TBF release timer expires before additional data blocks are received by the network node to transmit to said other node; and if, while in said predefined TBF mode, additional data blocks are received by the network node to transmit to said other node via said TBF before the TBF release timer has expired, the network node is configured to exit the predefined TBF mode, stop and reset the TBF release timer and enter the transmit state;

wherein the network node is a Mobile Station (MS), in which the ACK/NACK messages are Packet Uplink ACK/NACKs (PUANs) and the data blocks are Data radio blocks; and wherein the MS is arranged to, if it gets data blocks to transmit while it is in the extended uplink TBF mode, indicate that it has data blocks to transmit by means of including an indication of this in a Packet Downlink ACK/NACK (PDAN) for another TBF on which the MS receives data blocks, the PDAN being sent on the Packet Data Channel (PDCH).

4. A network node for a Global System for Mobile Communications/Enhanced Data for GSM Evolution (GSM/EDGE) cellular network, the network node comprising a processor and associated memory and being configured to:

establish a Temporary Block Flow (TBF) to another node in the GSM/EDGE cellular network and to enter a transmit state in which the network node transmits data blocks to said other node via said TBF and receives ACK/NACK messages for transmitted data blocks from said other node;

leave said transmit state if the network node does not have data blocks to transmit to said other node and has received positive ACK/NACK messages from said other node for all transmitted data blocks;

upon leaving said transmit state, start and monitor a TBF release timer and to enter a predefined TBF mode in which the network node regards said TBF as being released if the TBF release timer expires before additional data blocks are received by the network node to transmit to said other node; and if, while in said predefined TBF mode, additional data blocks are received by the network node to transmit to said other node via said TBF before the TBF release timer has expired, the network node is configured to exit the predefined TBF mode, stop and reset the TBF release timer and enter the transmit state;

wherein the network node is a Mobile Station (MS), in which the ACK/NACK messages are Packet Uplink ACK/NACKs (PUANs) and the data blocks are Data radio blocks; and wherein the MS is arranged to, if it gets data blocks to transmit while it is in the extended uplink TBF mode, indicate that it has data blocks to transmit by means of a radio burst on the Random Access Channel (RACH) of the cell that the MS is in, the radio burst comprising information which uniquely identifies the MS in the cell.

* * * * *